Dec. 8, 1953     F. B. REICHENBACH     2,661,800
ANIMAL FEEDING DEVICE
Filed Jan. 30, 1952     2 Sheets-Sheet 1
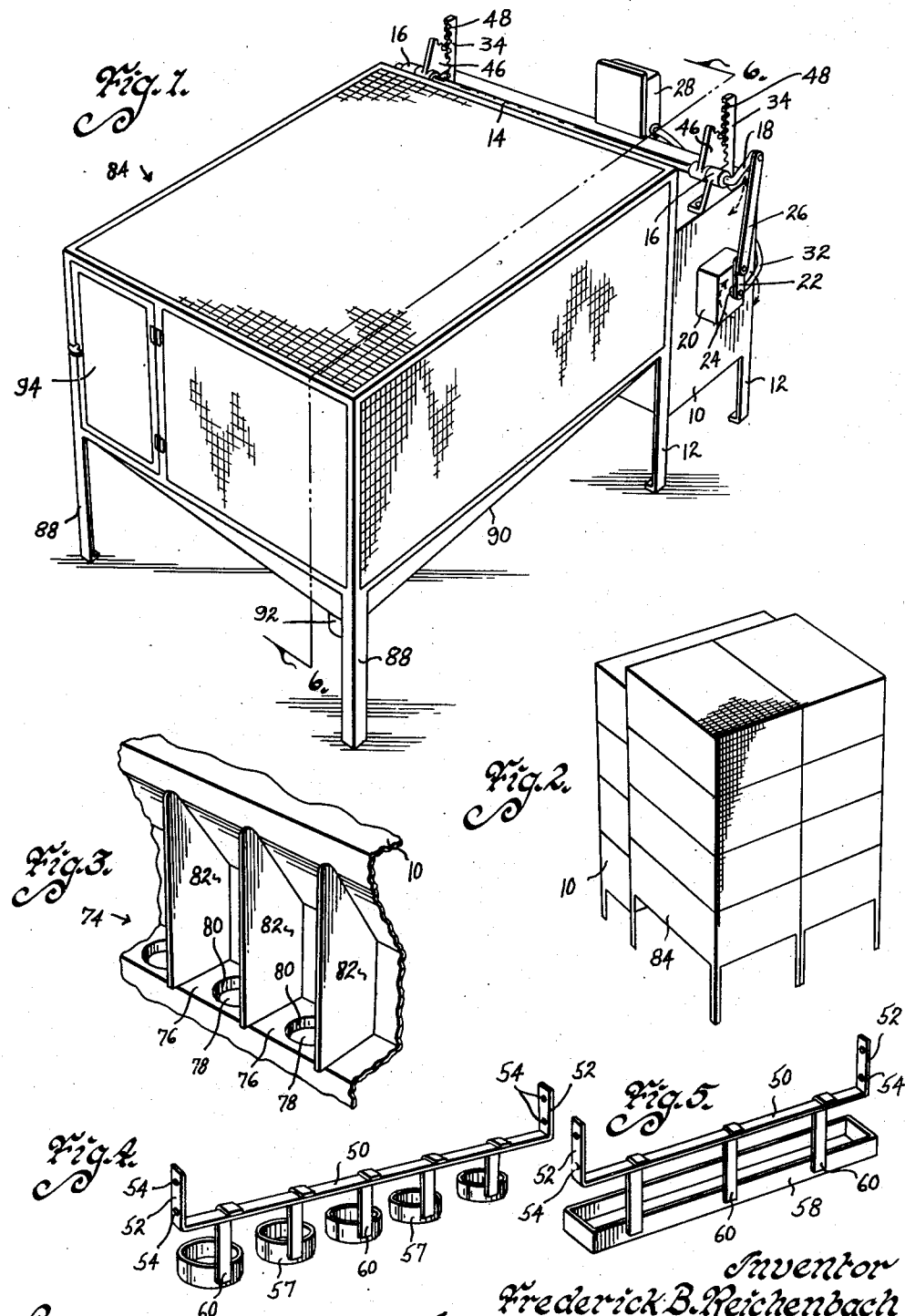
Inventor
Frederick B. Reichenbach
by Talbert Dick & Adler
Attorneys
Witness
Edward P. Seeley Dec. 8, 1953 F. B. REICHENBACH 2,661,800
ANIMAL FEEDING DEVICE
Filed Jan. 30, 1952 2 Sheets-Sheet 2
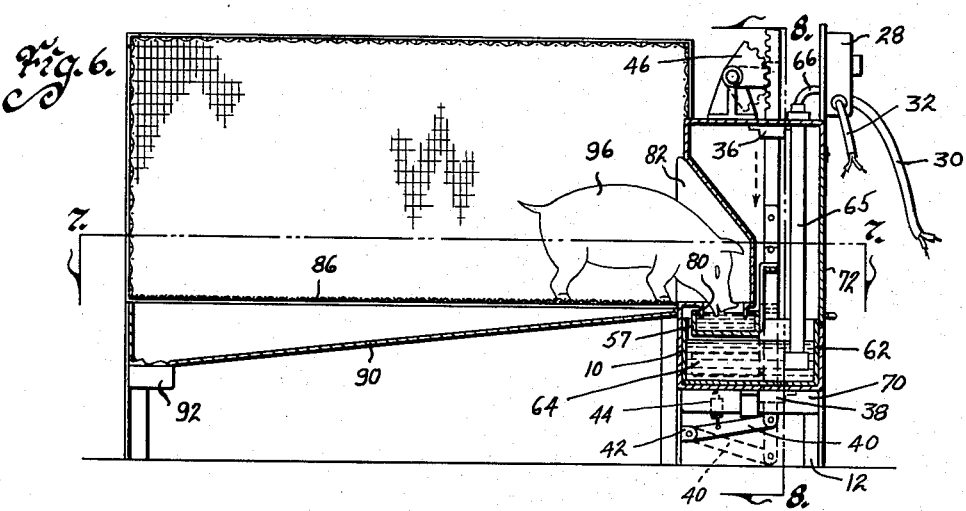
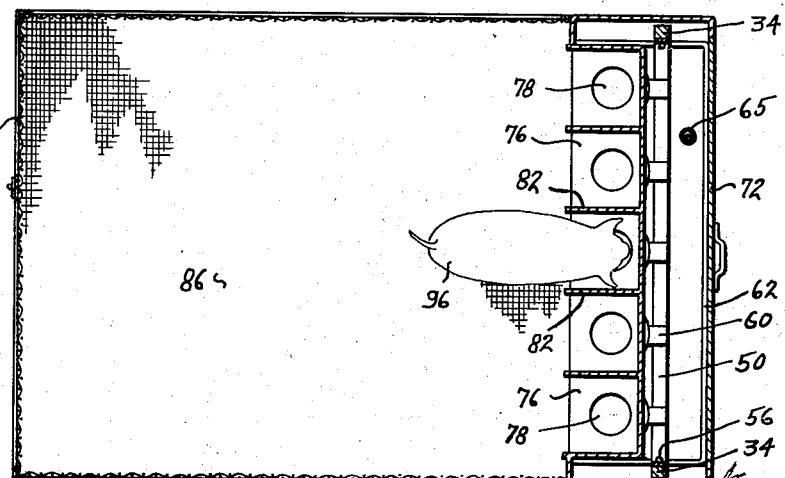
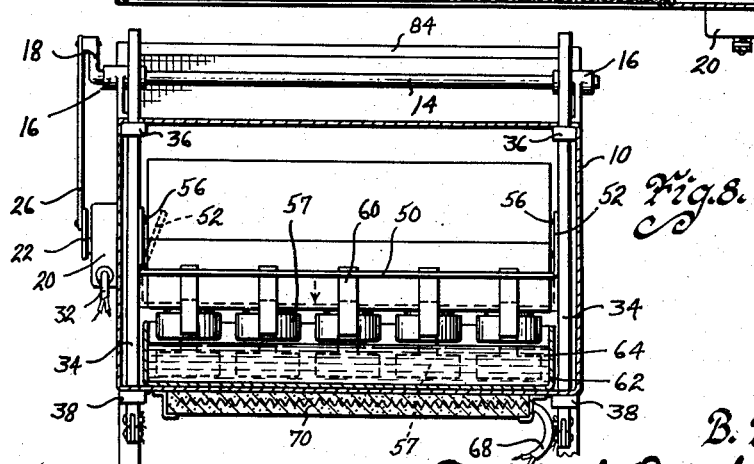
Inventor
Frederick
B. Reichenbach
by Talbert Dick & Adler
Attorneys Patented Dec. 8, 1953

2,661,800

UNITED STATES PATENT OFFICE 2,661,800

ANIMAL FEEDING DEVICE

Frederick B. Reichenbach, Des Moines, Iowa

Application January 30, 1952, Serial No. 269,027

12 Claims. (Cl. 161—10)

My invention relates to a device for feeding animals and is more particularly adapted for use in the feeding of small pigs, although its utility is not intended to be confined thereto.

In the raising of pigs at the present time, the generally accepted method is to have the brood sow suckle her young for six to eight weeks, and in this process, experience has demonstrated that approximately one-third of the litter does not survive for any one of several reasons, and also that the sow loses some one hundred or more pounds in the process. To replace the lost weight on the sow after the suckling period requires approximately six weeks, during which time the sow will consume about ten bushels of corn. Since a sow can be marketed three days after farrowing its young, it is obvious that the cost of feed for it during and after the suckling period can be very substantial when considered in the light of the number of sows marketed each year.

The advantages of feeding young pigs away from the sow are obvious if only the savings in feed of the sow are considered, and to this end much time and effort have been devoted to developing a method and means for accomplishing this objective. The chief drawback to success has been the lack of a suitable substitute for sow's milk and it is only recently that a formula has been developed which appears to be satisfactory. Consequently, with this new product a certain degree of success in raising young pigs away from the sow is now possible by making the imitation sow's milk available in pans or troughs placed inside pens. As presently practiced, the milk is mechanically delivered from overhead supply sources by means of tubes or conduits that empty into a receptacle from which the litter drinks. This practice is relatively new and several disadvantages are already apparent. The delivery of milk through tubes or conduits presents a problem in adequately cleaning such supply lines that has not been satisfactorily solved. Also, the open receptacles from which the milk is drunk provide the little pigs with a place in which to wallow and splash and in which they frequently deposit their body wastes. In addition, the milk as now supplied to the litter is not kept warm and if it is allowed to stand too long is more apt to curdle because of the absence of any stirring means therefor, unless stirred by hand.

With the above problems in mind, it is the general aim of my invention to provide an apparatus that will mechanically deliver liquid feed in a receptacle from which it can be consumed by small pigs. In this respect, the liquid provided is intended to be an artificial sow's milk and the feeding process performed by my invention is intended to be in lieu of having the sow suckle her young.

A further object of my invention is to provide a feeding device of the above class in which all elements contacting the milk are open to the atmosphere and are freely and easily accessible for the purpose of cleaning and sterilizing.

A still further object of this invention is to provide as a part of the apparatus set forth a thermostatically controlled means for maintaining the milk at a predetermined temperature.

Still a further object of my invention is to provide a feeding device for small pigs that embodies the use of a plurality of separate feeding stalls, each adapted to accommodate one pig, and each stall being so designed that while the pig can obtain an adequate supply of milk, it cannot get bodily into the receptacle to wallow in the milk and contaminate it.

A further object of my invention embodies the combination with the feeding device of the above class of a pen provided with a means for disposing of the body waste of the pigs so that it does not contaminate the milk nor dirty the pen.

Still a further object of this invention is to provide a pig feeding apparatus of the above class in which the milk supply is automatically stirred at predetermined intervals.

These and other objects will be apparent to those skilled in the art.

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 1 is a perspective view of my feeding device shown in combination with an enclosed feeding pen, Fig. 2 is a schematic view illustrating a plurality of my feeding devices arranged in a battery, Fig. 3 is an enlarged fragmentary perspective view showing the feeding stall arrangement for my invention, Fig. 4 illustrates the feeding cup assembly for my device, Fig. 5 illustrates a feeding trough as a variation for the cups shown in Fig. 4, Fig. 6 is an enlarged cross-sectional view taken on the line 6—6 of Fig. 1.

Fig. 7 is a cross-sectional view of this device taken from the line 7—7 of Fig. 6, and Fig. 8 is a rear view taken from the line 8—8 of Fig. 6.

Referring to the drawings, I have used the numeral 10 to designate a rectangular box-like housing in and on which I arrange my feeding mechanism. This housing is preferably mounted on legs 12, although this is not necessarily required. Extending across and spaced above the top of the housing 10 is a rotatable shaft 14 that is supported at each end by a pillow block or bearing member 16 which is suitably secured to the top of the housing as illustrated in Fig. 1. One end of the shaft 14 extends outwardly from its respective bearing member and is formed into the shape of a crank handle 18. A motor or the like 20 is mounted on the side of the housing 10 below the handle 18 (Fig. 1) and has the relatively short arm 22 which is secured at one end to the shaft 24 that protrudes from the motor. The damper motor is old and no invention is claimed in its construction or use per se. A rigid bar link 26 is pivotally connected at one end to the free end of the damper arm 22 and similarly connected at its other end to the handle 18.

An electric switch control box 28 that may be of any suitable type to perform the functions later described is secured to the housing, preferably on the outer side at the top, and is connected to a source of electric power by the cable or wire 30. The cable 32 connects the motor 20 to the control box 28. Oppositely disposed within the housing at points corresponding to the end portions of the shaft 14 are the vertically movable bar members 34 that have their upper and lower ends respectively extending through the top and bottom of the housing 10 as shown in Fig. 6. Each bar 34 passes through a bearing guide member 36 located on the underside of the housing top and a similar guide member 38 secured to the underside of the housing bottom (Fig. 6). To the bottom of each bar 34 there is pivotally secured one end of a rigid bar link 40, with each link 40 having its other end pivotally secured to an ear 42 that is mounted on one of the legs 12 as illustrated in Fig. 6. A separate coil spring 44 connects each link 40 to the bottom of the housing 10.

On each end portion of the shaft 14 adjacent to the inner side of the respective pillow blocks 16 is secured a gear member 46 which I preferably show in the form of a quadrant of a gear wheel. The teeth on each of these members 46 are positioned to mesh with gear teeth 48 on the upper portion of the corresponding bar 34 (Figs. 1 and 6). The quadrants will move with the shaft 14 and will therefore raise and lower the bars 34 according to the direction of rotation of the shaft. To the bottom portion of the bars 34 I detachably secure my drinking receptacle assembly, a preferred embodiment of which is shown in individual cup form in Fig. 4, but which may be made as a single trough as illustrated in Fig. 5. The drinking assembly comprises an elongated support bar 50 that has its end portions bent upwardly to form the bracket arms 52. In each arm 52 I provide a pair of holes 54 that will each frictionally embrace a boss 56 in the bottom portion of each of the bars 34 as illustrated in Fig. 8. Preferably, the arms 52 should have some resiliency so that they can be moved out of engagement with the boss members 56 as shown by the broken lines in Fig. 8, and thus allow easy removal of the drinking assembly for cleaning purposes. A series of spaced apart individual drinking cups 57, or a single trough 58 or like feed box, is secured below the support bar 50 in spaced relationship thereto by means of the metal straps 60. Thus arranged, the cups or trough will move upwardly and downwardly with the bar members 34. An open top feed supply receptacle, feed reservoir or pan 62 is removably arranged on the inside of the bottom of the housing 10 so that the cups 57 in their lowermost position will be within the confines thereof. This pan 62 is designed to contain a supply of a suitable feed here illustrated as liquid feed such as milk or the like 64 for the young pigs. A thermostat 65 is suitably mounted within the housing 10 so that one end thereof can extend into the pan 62 and be surrounded by the milk 64. The thermostat is connected by a cable 66 to the control box 28 which has a connection 68 to a heating element 70 located adjacent the underside of the housing 10. Thus the milk in the pan 62 can be kept at any temperature for which the thermostat is set. A door means 72 is provided on the rear of the housing so that the apparatus within the housing can be easily reached for purposes of cleaning or repairs and the replenishment of the milk supply.

Along the front side of the housing 10 I provide a plurality of adjacent drinking stalls 74 as shown in Fig. 3. These stalls comprise a horizontal surface 76 in which I provide a plurality of spaced apart openings 78, each of which has the downwardly extending annular flange 80. Separating the holes 78 from each other are the partitions 82 which produce the appearance of individual stalls. Each opening 78 registers with one of the cups 57, or with the trough 58 if a trough is used, and when the cups are in their uppermost position, the top edges thereof will be slightly higher than the bottom of the flanges 80, and these flanges will extend partly within the cups as shown in Fig. 6.

Preferably I provide in combination with my feeding device above described, a pen 84 that may be of any suitable size and design. In my preferred embodiment of the pen I use wire mesh for the top, sides and bottom, with one side open so that it can be arranged to enclose the stall portion 74 of my feeding apparatus. The floor 86 of the pen is removable and is on the same plane as the bottom 76 of the stall as illustrated in Fig. 6. Legs 88 may be provided for the pen if necessary. Beneath the pen floor I provided a fixed drop pan 90 that slants downwardly from the feeding end to the front of the pen and is designed so that body waste from the pigs will be funnelled into a removable receptacle 92. A door means 94 is arranged at the front of the pen as shown in Fig. 1.

Thus constructed and arranged, my invention will operate in the following manner. The pan 62 is used to hold a supply of whatever liquid feed is used, which in the case of small pigs will be an artificial sow's milk. The milk is manually placed in the pan and the supply can be replenished or replaced from time to time as may be required. Preferably I recommend that it be changed at intervals not longer than twelve hours and, at each changing, the pan should be removed for cleaning and sterilizing. The easy access to this pan through the door 72 and its open top construction make it possible to not only clean the pan quickly but also to thoroughly sterilize all parts thereon and is a decided advantage in this respect over feeding devices that employ the use of enclosed tubes or conduits. The thermostat 65 will control the operation of the heating element 70 to maintain the milk 64 at any desired temperature.

The operation of the motor 20 is controlled by a time clock mechanism (not shown) of any suitable make which is located in the switch box 28. Preferably I have used an eight minute interval at which time the arm 22 makes one complete revolution. It will be observed (Fig. 1) that when the motor is not in operation, the arm 22 extends upwardly so that the link member 26 is holding the crank arm 18 in its uppermost position, whereby the bars 34 are raised and the cups 57 are in drinking position for the pigs 96 as illustrated by the solid lines in Figs. 6 and 8. Consequently as the arm 22 begins to rotate clockwise, the crank handle descends and the quadrants 46 engage the teeth 48 on the bars 34 causing the cups 57 to descend and become submerged in the milk. When the damper arm 21 begins its upward movement, the crank arm 18 will be moved upwardly, which causes the cups to ascend to their original position. It will be observed that in this operation the crank arm does not make a complete revolution but merely moves upwardly and downwardly for a distance equal to that which the cups travel in their vertical movements. In the upward movement of the arm, the spring 44 will exert an upward pull on the member 40 to relieve the strain on the motor. The timing control should be set to stop the arm at its upward position after one complete revolution. By this operation, the cups are periodically submerged in warm milk and such submersion accomplishes two purposes. First, it refills the cups with warm milk, and secondly, it serves to stir and agitate the milk in the pan 62. I wish to point out that while I presently use an eight minute interval for the refilling of the cups, that future experience may demonstrate the desirability of a different timing interval and this, of course, can easily be accomplished without departing from the principle of my invention.

With this apparatus, it is apparent that a supply of warm milk is always available within the pen 84. Preferably, I suggest that not more than five stalls be provided for each pen to obtain the most efficiency in the handling of the pigs. Likewise, the number of pigs in the pen should not be greater than the number of feeding stalls available therein. In actual practice, experience has shown that the pigs quickly adapt themselves to drinking from the individual cups. The stall arrangement provided by the sides or partitions 82 serve a two-fold purpose during the feeding process. First, they conceal one pig from the view of the other while they are drinking so that each has a complete cup and milk supply to itself, and secondly, it provides a place to nudge against, which accommodates an inherent characteristic and habit of small pigs. Each stall is just large enough to receive the head of one pig and there is no way by which it can get bodily into the cup as occurs when large feeding receptacles are used. Consequently, the milk can be kept clean and the danger from disease and the like is materially reduced. The drop pan 90 will carry away the body wastes and particularly the urine, so that the problem of keeping the pigs dry is considerably reduced. Obviously, also, this entire apparatus can be kept in heated surroundings, if desired.

The use of this feeder can be started when the litter is three days old and the advantages flowing from this reflect themselves in the fact that the sow can thereafter be marketed without loss in weight and the additional costs of fattening as previously pointed out. If not marketed, the sow can be used to produce three litters a year instead of the customary two, which is currently the practice. In addition, from records of litters raised by use of my feeding apparatus, it appears that over ninety-five percent have not only survived but have accumulated from fifteen to twenty-five percent more body weight in the comparable feeding time for those suckled by the sow.

If the milk in the pan 62 is changed at regular intervals, as I have pointed out, it is not necessary to discard the unused supply as that can be fed to older pigs. Consequently, there is no financial loss in the use of artificial sow's milk.

With reference to Fig. 2, I have illustrated a schematic view of a battery arrangement to accommodate a large number of pigs. In this construction the use of my device can be easily adapted by using a separate pan 62 and a separate cup assembly for each tier. One set of bars 34 and one motor or the like will be sufficient for operating the entire battery as I have described.

It will be observed that the cup assembly is quickly and easily removable for cleaning, the same as the pan 62. Also, the floor of the pen is designed to be removable so not only can it be cleaned as required but easy access to the drop pan is available for the same purpose.

Some changes may be made in the construction and arrangement of my animal feeding device without departing from the real spirit and purpose of my invention, and it is my intention to cover by my claims, any modified forms of structure or use of mechanical equivalents which may be reasonably included within their scope.

I claim:

1. In an animal feeding device, a housing member provided with an opening in one side, a removable receptacle within said housing member, a pair of vertically spaced apart guide members in said housing member, a bar member mounted in said guide members and vertically movable therein, a rotatable shaft on said housing member, means on said housing operatively connected to said shaft for rotating the same first in one direction and then in another, said shaft operatively connected to said bar member whereby rotation of said shaft will move said bar member in two directions respectively, a cup member detachably secured to said bar member and movable into and out of said receptacle by movement of said bar member, and said cup member when out of said receptacle adapted to register with said opening whereby access to said cup member is available from outside of said housing member.

2. In an animal feeding device, a housing member, a removable receptacle within the bottom portion of said housing member, a pair of vertically spaced apart guide members in said housing member, a bar member mounted in said guide members and vertically movable therein, a rotatable shaft on said housing member, means on said housing for rotating said shaft first in one direction and then in another, said shaft operatively connected to said bar member whereby rotation of said shaft will move said bar member in two vertical directions respectively, a cup member detachably secured to said bar member above said receptacle and movable into and out of said receptacle by movement of said bar member, an animal feeding stall in one side of said housing member communicating with both the inside and outside thereof, said cup member when out of said receptacle adapted to register with said feeding stall whereby access to said cup member is available from outside of said housing member, and a thermostatically controlled heating element beneath said receptacle.

3. In an animal feeding device, a housing member, a removable receptacle within the bottom portion of said housing member, said receptacle designed to contain a supply of animal food, a pair of vertically spaced apart guide members in said housing member, a bar member mounted in said guide members and vertically movable therein, a rotatable shaft on said housing member, means on said housing for rotating said shaft first in one direction and then in another, said shaft operatively connected to said bar member whereby rotation of said shaft will move said bar member in two vertical directions respectively, a cup member detachably secured to said bar member above said receptacle and movable into and out of said receptacle by movement of said bar member, by which operation said cup becomes filled with the animal food in said receptacle, an animal feeding stall in one side of said housing member, said feeding stall comprising a horizontal surface provided with an opening that communicates with both the inside and outside of said housing at a point above said receptacle and a partition member on each side of said opening, said cup member when out of said receptacle adapted to register with said opening whereby access to said cup member is available from outside of said housing member, and a thermostatically controlled heating element beneath said receptacle for maintaining the food in said receptacle at a predetermined temperature.

4. In an animal feeding device, a housing member provided with an opening in one side, a removable feed supply receptacle disposed within said housing member in the lower portion thereof, a pair of vertically spaced apart guide members in said housing member, a bar member mounted in said guide members and vertically movable therein, a rotatable shaft on said housing member, means on said housing operatively connected to said shaft for rotating the same in opposite directions at times, said shaft operatively connected to said bar member whereby rotation of said shaft in one direction will move said bar member upwardly and rotation thereof in the other direction will move said bar downwardly, a feed box detachably secured to said bar member so as to move into and out of said feed supply receptacle by the respective movements of said bar member, said feed box becoming filled with feed each time it moves into and out of said feed supply receptacle, and said feed box when out of said feed supply receptacle adapted to register with said opening where access thereto is available for feeding purposes from outside of said housing member.

5. In an animal feeding device, a housing member provided with an opening in one side, a removable feed supply receptacle disposed within said housing member in the lower portion thereof, a pair of vertically spaced apart guide members in said housing member, a bar member mounted in said guide members and vertically movable therein, a rotatable shaft on said housing member, means on said housing operatively connected to said shaft for rotating the same in opposite directions at times, said shaft operatively connected to said bar member whereby rotation of said shaft in one direction will move said bar member upwardly and rotation thereof in the other direction will move said bar downwardly, a feed box detachably secured to said bar member so as to move into and out of said feed supply receptacle by the respective movements of said bar member, said feed box becoming filled with feed each time it moves into and out of said feed supply receptacle, and said feed box when out of said feed supply receptacle adapted to register with said opening where access thereto is available for feeding purposes from outside of said housing member; said means for rotating said shaft normally holding said bar in its uppermost position, and time control means connected to said rotating means for moving said bar at predetermined intervals first downwardly and then upwardly to its starting position.

6. In an animal feeding device, a housing member provided with an opening in one side, a removable feed supply receptacle disposed within said housing member in the lower portion thereof, a pair of vertically spaced apart guide members in said housing member, a bar member mounted in said guide members and vertically movable therein, a rotatable shaft on said housing member, means on said housing operatively connected to said shaft for rotating the same in opposite directions at times, said shaft operatively connected to said bar member whereby rotation of said shaft in one direction will move said bar member upwardly and rotation thereof in the other direction will move said bar downwardly, a feed box detachably secured to said bar member so as to move into and out of said feed supply receptacle by the respective movements of said bar member, said feed box becoming filled with feed each time it moves into and out of said feed supply receptacle, and said feed box when out of said feed supply receptacle adapted to register with said opening where access thereto is available for feeding purposes from outside of said housing member; and time control means connected to said shaft rotating means for holding said feed box in registering position with said opening for a predetermined interval and for periodically operating said rotating means to move said feed box into and out of said feed supply reservoir and back to said opening whereby the feed in said feed box is regularly replenished.

7. In an animal feeding device, a housing member provided with an opening in one side, a removable reservoir for liquid feed disposed within said housing member in the lower portion thereof, a pair of vertically spaced apart guide members in said housing member, a bar member mounted in said guide members and vertically movable therein, a rotatable shaft on said housing member, motor means on said housing for rotating said shaft at predetermined intervals, first in one direction for a predetermined time and then in the opposite direction to its starting position, said shaft operatively connected to said bar member whereby rotation of said shaft will move said bar member in two vertical directions respectively, a cup member detachably secured to said bar member and movable into and out of said reservoir by the respective movements of said bar member, said cup becoming filled with liquid feed each time it moves into and out of said reservoir, and said cup member when out of said reservoir adapted to register with said opening where access thereto is available from outside of said housing member.

8. In an animal feeding device, a housing member provided with an opening in one side, a removable reservoir for liquid feed disposed within said housing member in the lower portion thereof, a pair of vertically spaced apart guide members in said housing member, a bar member mounted in said guide members and vertically movable therein, a rotatable shaft on said housing member, motor means on said housing for rotating said shaft at predetermined intervals, first in one direction for a predetermined time and then in the opposite direction to its starting position, said shaft operatively connected to said bar member whereby rotation of said shaft will move said bar member in two vertical directions respectively, a cup member detachably secured to said bar member and movable into and out of said reservoir by the respective movements of said bar member, said cup becoming filled with liquid feed each time it moves into and out of said reservoir, and said cup member when out of said reservoir adapted to register with said opening where access thereto is available from outside of said housing, and a thermostatically controlled heating element in said housing beneath said reservoir for maintaining the feed in said reservoir at a predetermined temperature.

9. In an animal feeding device, a housing member, a removable receptacle within the bottom portion of said housing member, a pair of vertically spaced apart guide members in said housing member, a bar member mounted in said guide members and vertically movable therein, a rotatable shaft on said housing member, means on said housing for rotating said shaft first in one direction and then in another, said shaft operatively connected to said bar member whereby rotation of said shaft will move said bar member in two vertical directions respectively, a cup member detachably secured to said bar member above said receptacle and movable into and out of said receptacle by movement of said bar member, an animal feeding stall in one side of said housing member communicating with both the inside and outside thereof, said cup member when out of said receptacle adapted to register with said feeding stall whereby access to said cup member is available from outside of said housing member.

10. In an animal feeding device, a housing member provided with an opening in one side, a removable reservoir for liquid feed disposed within said housing member in the lower portion thereof, a pair of vertically spaced apart guide members in said housing member, a bar member mounted in said guide members and vertically movable therein, a rotatable shaft on said housing member, motor means on said housing for rotating said shaft at predetermined intervals, first in one direction for a predetermined time and then in the opposite direction to its starting position, said shaft operatively connected to said bar member whereby rotation of said shaft will move said bar member in two vertical directions respectively, a cup member detachably secured to said bar member and movable into and out of said reservoir by the respective movements of said bar member, said cup becoming filled with liquid feed each time it moves into and out of said reservoir, and said cup member when out of said reservoir adapted to register with said opening where access thereto is available from outside of said housing member, and the movement of said cup into and out of said reservoir serving as a stirring means for the liquid feed in said reservoir.

11. In an animal feeding device, a housing member provided with an opening in one side, a removable feed supply receptacle within said housing member, a pair of vertically spaced apart guide members in said housing member, a bar member mounted in said guide members and vertically movable therein, a rotatable shaft on said housing member, means on said housing operatively connected to said shaft for rotating the same in two directions respectively, said shaft operatively connected to said bar member whereby rotation of said shaft in one direction will move said bar member downwardly and rotation of said shaft in the other direction will move said bar member upwardly, an animal feeding stall in one side of said housing member communicating with both the inside and outside thereof at a point above said feed supply receptacle, a cup member detachably secured to said bar member and movable therewith in a vertical plane into and out of said feed supply receptacle intermediate said receptacle and said feeding stall, and said cup member when out of said receptacle adapted to register with said feeding stall where access thereto is available from outside of said housing member and from which animals can feed.

12. In an animal feeding device, a housing member provided with an opening in one side, a removable feed supply receptacle within said housing member, a pair of vertically spaced apart guide members in said housing member, a bar member mounted in said guide members and vertically movable therein, a rotatable shaft on said housing member, means on said housing operatively connected to said shaft for rotating the same in two directions respectively, said shaft operatively connected to said bar member whereby rotation of said shaft in one direction will move said bar member downwardly and rotation of said shaft in the other direction will move said bar member upwardly, an animal feeding stall in one side of said housing member communicating with both the inside and outside thereof at a point above said feed supply receptacle, a cup member detachably secured to said bar member and movable therewith in a vertical plane into and out of said feed supply receptacle intermediate said receptacle and said feeding stall, and said cup member when out of said receptacle adapted to register with said feeding stall where access thereto is available from outside of said housing member and from which animals can feed, and time control means connected to said shaft rotating means for holding said feed box in registering position with said stall for a predetermined interval and for periodically operating said rotating means to move said feed box into and out of said feed supply receptacle and back to said stall whereby the feed in said feed box is regularly replenished.

FREDERICK B. REICHENBACH.

References Cited in the file of this patent
UNITED STATES PATENTS

| Number | Name | Date |
|---|---|---|
| 88,211 | Reed | Mar. 23, 1869 |
| 619,688 | Linn | Feb. 14, 1899 |
| 1,057,490 | Moren | Apr. 1, 1913 |
| 1,176,214 | Graham | Mar. 21, 1916 |
| 1,271,937 | Rebman | July 9, 1918 |
| 1,737,797 | Jacot | Dec. 3, 1929 |

FOREIGN PATENTS

| Number | Country | Date |
|---|---|---|
| 11,671 | Great Britain | 1889 |